United States Patent
Judd

(10) Patent No.: US 6,731,904 B1
(45) Date of Patent: *May 4, 2004

(54) SIDE-TO-SIDE REPEATER

(75) Inventor: Mano D. Judd, Rockwall, TX (US)

(73) Assignee: Andrew Corporation, Orland Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/357,032

(22) Filed: Jul. 20, 1999

(51) Int. Cl.[7] .............................................. H04Q 7/20
(52) U.S. Cl. ................................ 455/11.1; 455/13.1
(58) Field of Search ............................ 455/402, 426, 455/11.1, 13.1, 13.3, 16, 17, 19, 520, 566, 572, 90, 575, 95, 561, 562, 7, 63, 67.1, 280, 296, 278.1; 343/751, 844, 853, 890, 891, 893, 879, 907, 700; 370/279, 274, 275, 492; 340/853.7, 7.25, 825.53

(56) References Cited

U.S. PATENT DOCUMENTS

| | | | | |
|---|---|---|---|---|
| 3,728,733 A | | 4/1973 | Robinson | 343/765 |
| 3,731,315 A | | 5/1973 | Sheleg | 343/854 |
| 4,032,922 A | | 6/1977 | Provencher | 343/854 |
| 4,041,389 A | | 8/1977 | Oades | 325/3 |
| 4,099,036 A | * | 7/1978 | Migeon | 340/425.2 |
| 4,189,675 A | | 2/1980 | Rielly et al. | 325/4 |
| 4,198,600 A | * | 4/1980 | Oguchi et al. | 455/15 |
| 4,246,585 A | | 1/1981 | Mailloux | 343/854 |
| 4,317,217 A | | 2/1982 | Davidson et al. | 455/24 |
| 4,318,104 A | | 3/1982 | Enein | 343/100 LE |
| 4,338,605 A | | 7/1982 | Mims | 343/100 LE |
| 4,352,202 A | | 9/1982 | Carney | 455/151 |
| 4,407,001 A | | 9/1983 | Schmidt | 343/840 |
| 4,446,463 A | | 5/1984 | Irzinski | 343/371 |
| 4,701,935 A | | 10/1987 | Namiki | 374/4 |
| 4,727,590 A | * | 2/1988 | Kawano et al. | 455/446 |
| 4,777,652 A | | 10/1988 | Stolarczyk | 455/3 |
| 4,789,993 A | | 12/1988 | Ryu | 375/4 |
| 4,843,402 A | | 6/1989 | Clement | 343/758 |
| 4,849,763 A | | 7/1989 | DuFort | 342/372 |
| 4,849,963 A | | 7/1989 | Kawano et al. | 370/30 |
| 4,879,711 A | | 11/1989 | Rosen | 370/50 |
| 4,973,971 A | | 11/1990 | Sinsky et al. | 342/373 |
| 4,980,665 A | * | 12/1990 | Schotz | 340/310.02 |
| 4,994,813 A | | 2/1991 | Shiramatsu et al. | 342/360 |
| 5,019,793 A | | 5/1991 | McNab | 333/156 |
| 5,054,120 A | | 10/1991 | Ushiyama et al. | 455/351 |
| 5,086,302 A | | 2/1992 | Miller | 342/373 |
| 5,089,823 A | | 2/1992 | Vasile | 342/383 |
| 5,115,514 A | | 5/1992 | Leslie | 455/9 |
| 5,128,687 A | | 7/1992 | Fay | 343/754 |
| 5,241,410 A | * | 8/1993 | Streck et al. | 359/152 |
| 5,321,412 A | * | 6/1994 | Kopp et al. | 340/572.7 |
| 5,349,694 A | | 9/1994 | Kawano et al. | 455/11.1 |
| 5,351,060 A | | 9/1994 | Bayne | 343/766 |

(List continued on next page.)

FOREIGN PATENT DOCUMENTS

| | | |
|---|---|---|
| GB | 2 286 749 A | 8/1995 |
| WO | WO 97/42720 | 11/1997 |
| WO | WO 98/11626 | 3/1998 |

*Primary Examiner*—Nay Maung
*Assistant Examiner*—Jean A Gelin
(74) *Attorney, Agent, or Firm*—Wood, Herron & Evans, L.L.P.

(57) ABSTRACT

A modular repeater includes a housing having a pair of substantially 180° oppositely facing surfaces. At least one antenna element is mounted to each of these surfaces for radiating energy in a direction opposite to that of the antenna element mounted to the other of these surfaces. An electronic circuit is mounted within the housing and operatively couples signals between at least one antenna element on each of the oppositely facing surfaces of the module housing.

44 Claims, 11 Drawing Sheets

U.S. PATENT DOCUMENTS

| | | | | |
|---|---|---|---|---|
| 5,392,054 A | * | 2/1995 | Bottomley et al. | 343/702 |
| 5,444,864 A | | 8/1995 | Smith | 455/84 |
| 5,463,401 A | | 10/1995 | Iwasaki | 342/359 |
| 5,485,170 A | | 1/1996 | McCarrick | 343/895 |
| 5,486,835 A | | 1/1996 | Hock | 342/359 |
| 5,512,906 A | | 4/1996 | Speciale | 342/375 |
| 5,587,715 A | * | 12/1996 | Lewis | 455/12.1 |
| 5,589,843 A | | 12/1996 | Meredith et al. | 343/820 |
| 5,600,333 A | | 2/1997 | Justice et al. | 343/713 |
| 5,633,647 A | | 5/1997 | Tines | 343/766 |
| 5,663,736 A | | 9/1997 | Webb et al. | 342/375 |
| 5,754,138 A | | 5/1998 | Turcotte et al. | 342/373 |
| 5,754,139 A | | 5/1998 | Turcotte et al. | 342/373 |
| 5,758,287 A | | 5/1998 | Lee et al. | 455/450 |
| 5,767,807 A | | 6/1998 | Pritchett | 342/374 |
| 5,805,113 A | * | 9/1998 | Ogino et al. | 343/713 |
| 5,832,365 A | | 11/1998 | Chen et al. | 455/15 |
| 5,835,848 A | * | 11/1998 | Bi et al. | 455/24 |
| 5,856,804 A | | 1/1999 | Turcotte et al. | 342/371 |
| 5,937,332 A | | 8/1999 | Karabinis | 455/12.1 |
| 5,943,618 A | * | 8/1999 | Jackson et al. | 455/426 |
| 5,963,847 A | * | 10/1999 | Ito et al. | 455/17 |
| 6,029,048 A | * | 2/2000 | Treatch | 455/11.1 |
| 6,043,790 A | | 3/2000 | Derneryd et al. | 343/853 |
| 6,049,315 A | * | 4/2000 | Meyer | 343/895 |
| 6,078,787 A | * | 6/2000 | Schefte et al. | 455/16 |
| 6,125,109 A | * | 9/2000 | Fuerter | 370/315 |
| 6,128,471 A | | 10/2000 | Quelch et al. | 455/25 |
| 6,128,557 A | * | 10/2000 | Fenton et al. | 342/357.02 |
| 6,198,460 B1 | | 3/2001 | Brankovic | 343/879 |
| 6,256,484 B1 | * | 7/2001 | Conner et al. | 455/137 |
| 6,285,878 B1 | * | 9/2001 | Lai | 455/431 |
| 6,348,986 B1 | * | 2/2002 | Doucet | 359/172 |

* cited by examiner

SIDE VIEW

SIDE-TO-SIDE REPEATER

BACKGROUND OF THE INVENTION

Repeater systems are typically used where the area to be covered and/or capacity requirements do not justify the installation of a full Cellular/PCS base station with managed frequency-channel allocation. Thus, as shown in FIG. 1, tower-mounted repeater systems are often used to extend the range of a cell site, to provide null fill in regions that are RF blocked, such as by hills or trees, and/or to provide enhanced "in-building" coverage, via directing the signal power to the desired structures, such as a building 30.

The typical repeater system comprises three basic parts shown in FIG. 2 and FIG. 3: the link antenna 22 which is directed/aimed at the wireless base station (BS); the amplifying electronics "box" 24, and the broadcast antenna 26—which is directed towards the area of interest. Often, the link antenna 22 is highly directive (high gain) with a very narrow beam, since it only needs to "see" the base station. The broadcast antenna 26 is more defined by the beamwidth necessary to cover the intended area. The electronics box 24 may contain an assortment of diplexers, filters, splitters, and RF amplifiers.

Two of the main performance factors on which a system is based are gain and output power. The output power is mostly determined by the sum of the two passive antenna (link and broadcast) gains and the maximum (linear) output power of the amplifier(s). The system gain is determined by the sum of the passive antenna gains, plus the gain of the amplifier stage. This is limited by the isolation (or mutual coupling) between the two (broadcast and link) antennas. The isolation depends on the antenna type, front to back (F/B) ratio and beamwidth.

For example, assume two opposing antennas, each with 20 dB directivity. Further, assume a F/B ratio of about 25 dB. The isolation between antennas is therefore about 50 dB, which is the sum of the two F/B ratios (25 dB+25 dB). To keep the amplifiers from oscillating, a safety factor of about 20 dB is recommended, which translates to an active (amplifier) gain to about 30 dB (50–20). However, the total system gain is the sum of the passive gains (directivity) plus the active gain, which, in this example, is 20+20+30=70 dB.

Normally, a well designed antenna should have a front to back ratio (F/B) better than 20 dB. For very high gain antennas, the F/B can be as high as 40 dB. However, as the F/B is increased, so typically is the directivity; which means that the antenna's beamwidth is narrowed. For repeater applications, this might prove disadvantageous, since the coverage area (sector width) is reduced.

Orientation and separation distance of the antennas is also a factor. In the near field, the propagation path loss is proportional to $1/R$, where R is the radius or distance between the two antennas (note, it is $1/R^2$ for the far field). Thus, for two PCS antennas, back to back, seperated by about 10 feet, the propagation loss is about 24 dB. This therefore increases the isolation between the two antennas by 24 dB. However, it is now much harder to accurately orient the antennas, so that they are truly in-line, maximizing their F/B ratio isolation.

This is a significant issue for most operators (customers). Aligning the two antennas, such that they are exactly opposing (one pointed 180 degrees away from the other), can be extremely difficult and time consuming.

Existing indoor repeater systems, typically employ a separate link antenna 32, either on the roof, or on the side of a building (FIG. 4). The RF power is routed to the electronics portion of the repeater via a coaxial cable 34, often with an amplifier stage (not shown) in between. The indoor RF distribution system is either one or more antennas 36, or some other RF emission/reception mechanism, such as radiax (leaky wave) cable, or RF stripline cable 38. The labor for installing these indoor radiation systems (antennas or leaky wave cables) is usually intensive and costly. Additionally, since propagation characteristics inside a building are complex to estimate, or model, multiple radiators are usually used to assure adequate coverage to all portions of the building.

Existing repeater systems, mostly for outdoor use, use physically separate antennas (i.e., physically separate from the amplifier/electronics module/box), one pointed towards the wireless base station, and the other pointed towards the (broadcast) area of interest. This requires mounting/installation of three different units, and labor intensive orientation of the two antennas to maximize the RF isolation, to achieve maximum system gain.

Similar to the outdoor repeater system(s), indoor repeaters require accurate orientation (labor intensive) between the two antennas to insure maximum RF isolation, and to prevent signal feedBack and therefore "ringing" in the circuit.

SUMMARY OF THE INVENTION

A modular repeater comprises a housing having a pair of substantially 180° oppositely facing surfaces, at least one antenna element mounted to each of said surfaces for radiating energy in a direction opposite to that of an antenna element mounted to the other of said surfaces, and an electronic circuit mounted within said housing and operatively coupling signals between at least one antenna element on each of said oppositely facing surfaces of said module.

DETAILED DESCRIPTION OF THE ILLUSTRATED EMBODIMENTS

Figure 1:
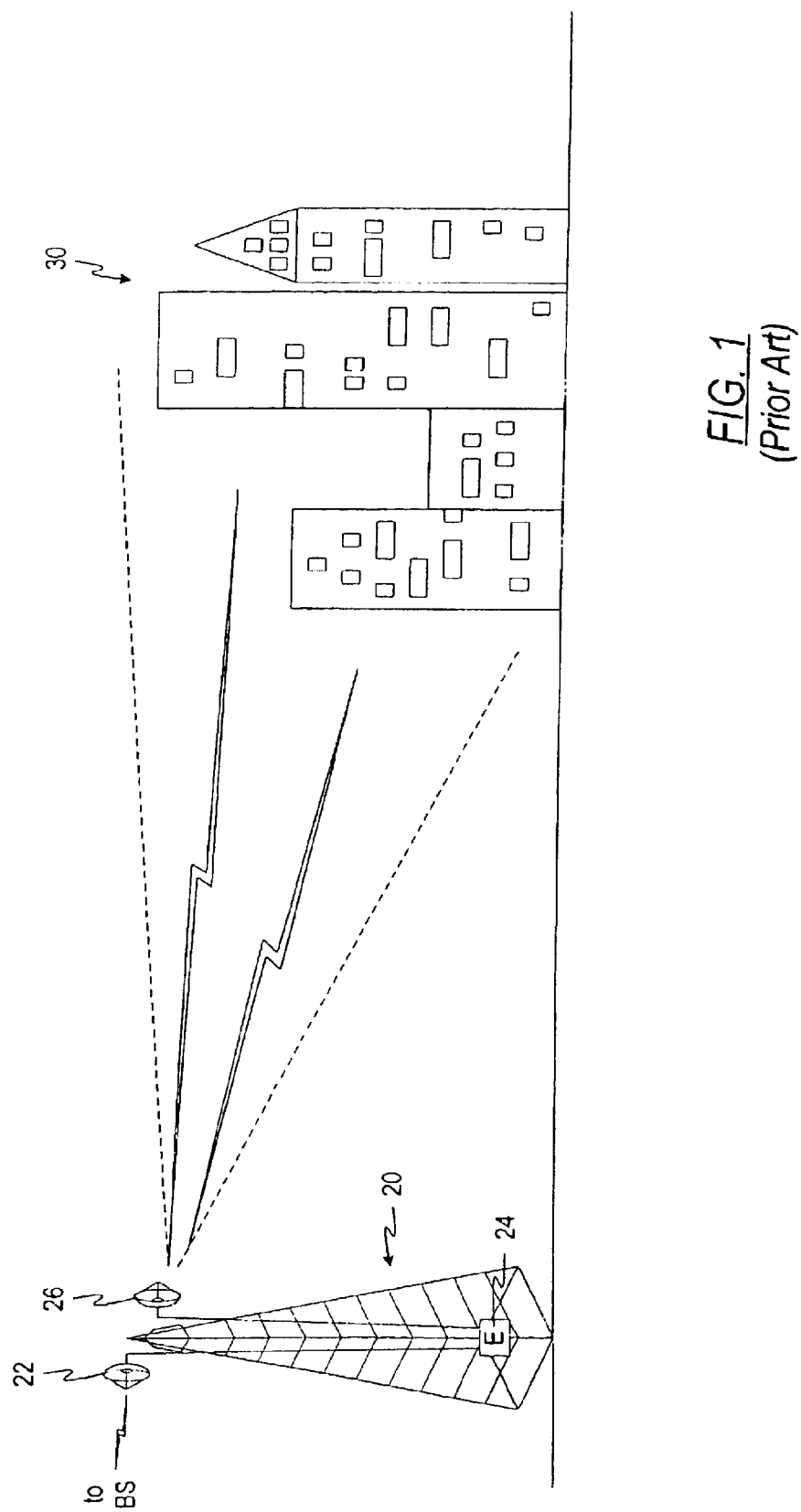
FIG. 1 is a tower-mounted repeater system in accordance with the prior art.
Figure 2:
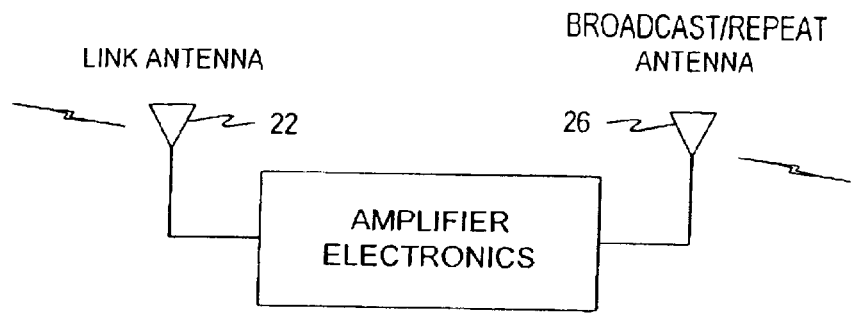
FIG. 2 is a simplified schematic diagram of the tower-mounted repeater of FIG. 1.
Figure 3:
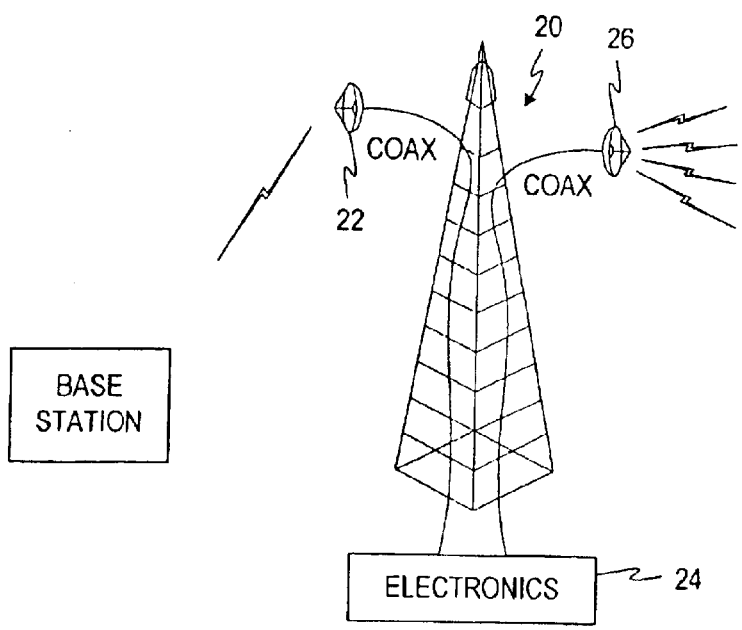
FIG. 3 is a diagramatic representation of the tower-mounted repeater of FIG. 1.
Figure 4:
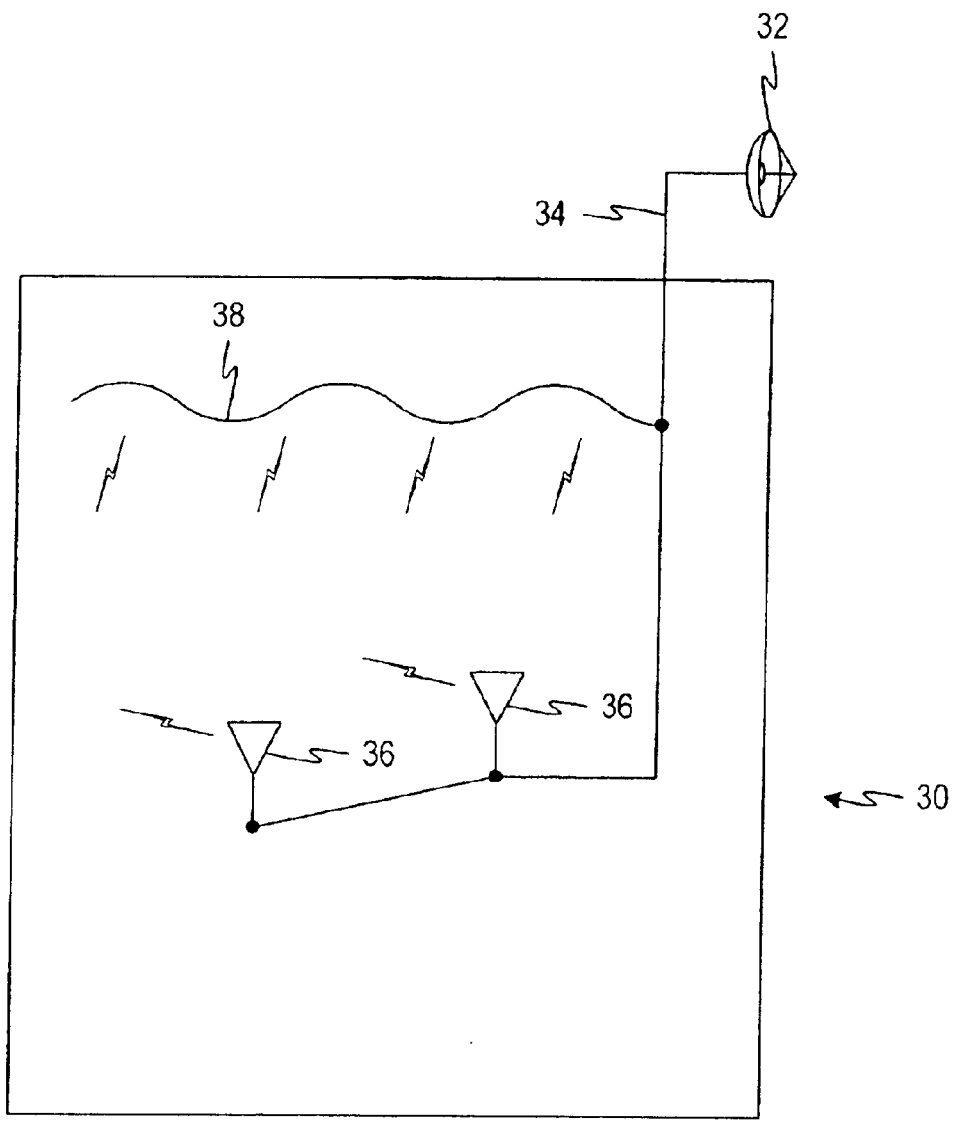
FIG. 4 is a diagramatic representation of a prior art form of indoor repeater system.
Figure 5:
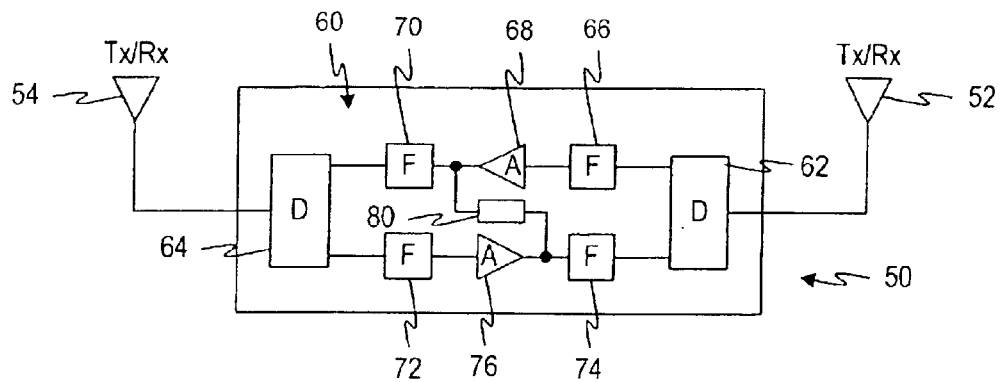
FIG. 5 is a schematic representation of a repeater module in accordance with one embodiment of the invention.
Figure 6:
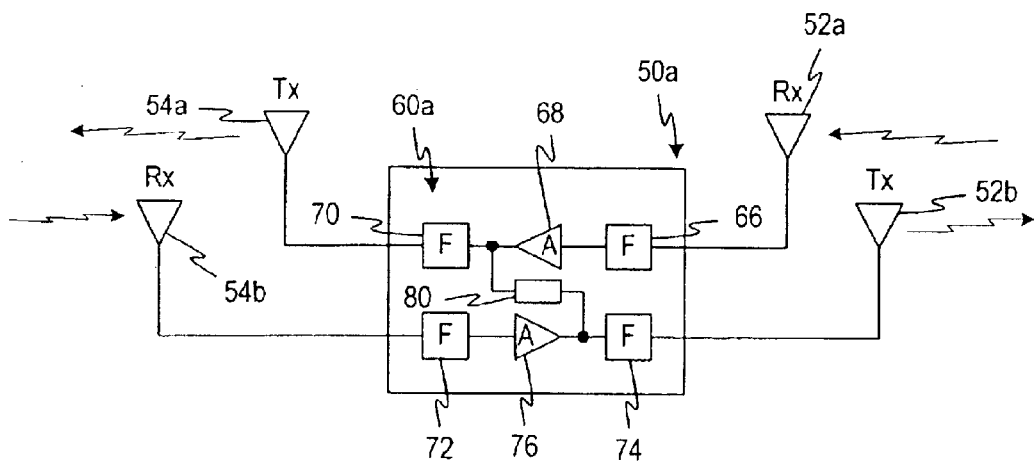
FIG. 6 is a schematic representation of another form of repeater module in accordance with another embodiment of the invention.

In the embodiments illustrated in FIGS. 5–8, all of the components are provided in a compact modular form, as a "repeater module" 50. Two antennas 52, 54 (or sets of antennas in the embodiment of FIGS. 6 and 8) are located on the exterior of two sides of a module housing, body or "box" 56. Two different system architectures are shown in FIGS. 5 and 6. FIG. 5 shows an architecture for a two antenna system, in which each antenna operates in both the transmit and receive mode. For example, the first antenna 52 might be used to receive an incoming RF signal from a transmitter or from another repeater, that is, in the link mode. This antenna and the associated circuitry to be described below would therefore usually operate in the frequency band of the incoming RF signal or signals to be received. The other antenna 54 would be utilized in the broadcast/repeat mode to transmit (and receive) signals to the user equipment, such as a remote handset or terminal, or to transmit a signal to a further repeater in a system using multiple repeaters to broadcast or distribute signals. Therefore, this second antenna 54 and its associated circuits, described below, would usually operate in the frequency band of the remote handset or terminal.

Frequency diplexers (D) 62, 64 are used in the electronics module 60, to separate the power for each path. For example, RF power received on antenna 52 is routed through the diplexer 62 through a first circuit or path. This first circuit includes a filter 66 to attenuate the reverse link band, an amplifier 68 to amplify the RF, and then another filter 70, used to protect the amplifier 68 from signal power on the other circuit or path. The second diplexer 64 then delivers the signal to antenna 54 which retransmits the signal. In the reverse direction, antenna 54 receives a signal which is fed through diplexer 64 to a second circuit or path including similar filters 72, 74 and a similar amplifier 76 which operate in the same manner as the first circuit and feed a signal through a diplexer 62 to be transmitted at the antenna 52.

FIG. 6 shows two sets of antennas: 52*a*, 54*a* and 52*b*, 54*b*, two antennas for the link mode and two for the broadcast/repeat mode. When two sets of antennas are utilized, the antennas 52*a*, 52*b* on one side may be used for the link mode, as described above, one as the downlink antenna and one as an uplink antenna. Similarly, the two antennas 52*b*, 54*b* on the other side would be used in the broadcast/repeat mode, as described above, one as an uplink antenna and one as a downlink antenna. Similar electronic circuits or paths including filters and amplifiers are interposed between the respective pairs of antennas 52*a*, 54*a* and 52*b*, 54*b*. However, because separate pairs of antennas are provided, no frequency diplexers are required in this case.

The filters 66, 70, 72, 74 are selected so as to be sufficient to reduce the out-of-band signals. The filters are usually band pass types. For a PCS based system, the band pass bandwidth will usually be around 15 Mhz, commensurate with the bandwidth of PCS bands C, D, E, F, etc. Cut off and roll-off are more performance and spec oriented, and depend on circuit design.

In one embodiment, the amplifier elements 68, 76 comprise relatively low power, linear integrated circuit chip components, such as monolithic microwave integrated circuit (MMIC) chips. These chips may comprise chips made by the Gallium Arsenide (GaAs) heterojunction transistor manufacturing process. However, silicon process chips or CMOS process chips might also be utilized.

Some examples of MMIC power amplifier chips are as follows:

1. RF Microdevices PCS linear power amplifier RF 2125P, RF 2125, RF 2126 or RF 2146, RF Micro Devices, Inc., 7625 Thomdike Road, Greensboro, N.C. 27409, or 7341-D W. Friendly Ave., Greensboro, N.C. 27410;
2. Pacific Monolithics PM 2112 single supply RF IC power amplifier, Pacific Monolithics, Inc., 1308 Moffett Park Drive, Sunnyvale, Calif.;
3. Siemens CGY191, CGY180 or CGY181, GaAs MMIC dual mode power amplifier, Siemens AG, 1301 Avenue of the Americas, New York, N.Y.;
4. Stanford Microdevices SMM-208, SMM-210 or SXT-124, Stanford Microdevices, 522 Almanor Avenue, Sunnyvale, Calif;
5. Motorola MRFIC 1817 or MRFIC 1818, Motorola Inc., 505 Barton Springs Road, Austin, Tex.;
6. Hewlett Packard HPMX-3003, Hewlett Packard Inc., 933 East Campbell Road, Richardson, Tex;
7. Anadigics AWT1922, Anadigics, 35 Technology Drive, Warren, N.J. 07059;
8. SEI Ltd. P0501913H, 1, Taya-cho, Sakae-ku, Yokohama, Japan; and
9. Celeritek CFK2062-P3, CCS1930 or CFK2162-P3, Celeritek, 3236 Scott Blvd., Santa Clara, Calif. 95054.

Figure 7:
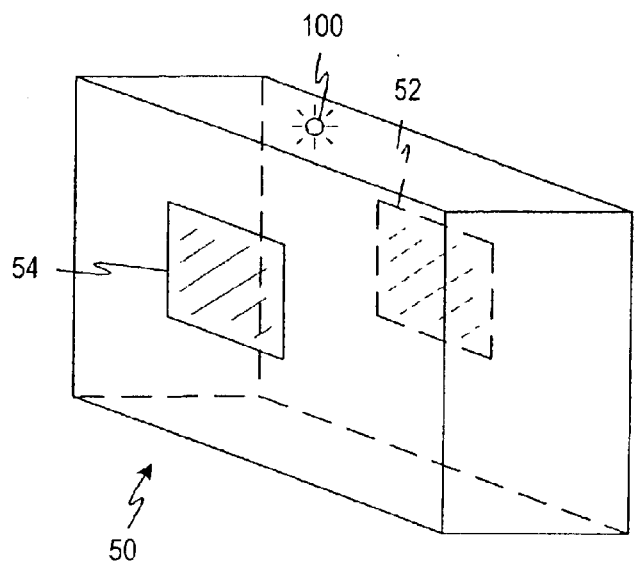
FIG. 7 is a simplified illustration of one form of modular repeater in accordance with one form of the invention.
Figure 8:
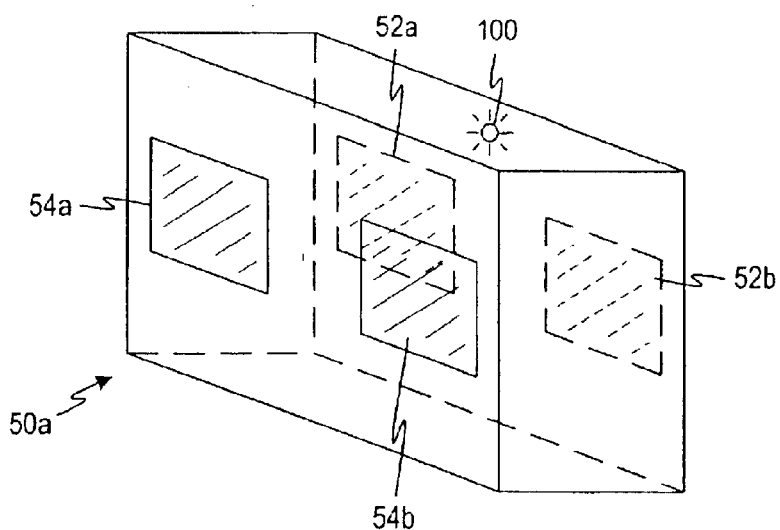
FIG. 8 is a simplified illustration of a second form of modular repeater in accordance with the invention.
Figure 16:
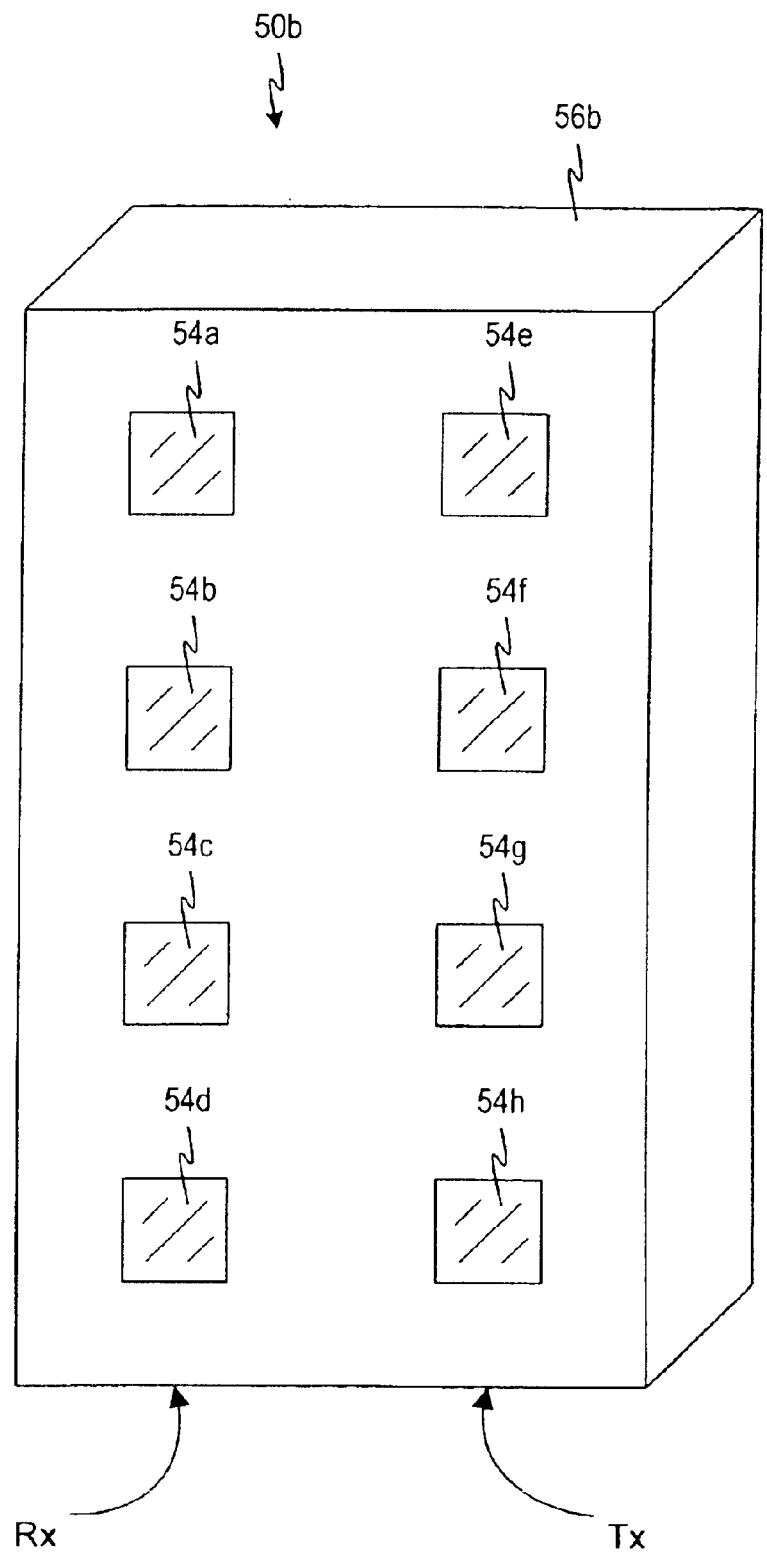
FIG. 16 is a simplified perspective view similar to FIGS. 7 and 8, showing another embodiment of a modular repeater.

FIGS. 7, 8 and 16 show examples of the physical systems or modules 50, 50*a*, and 50*b*. FIGS. 7 and 8 correspond respectively to the systems described above with reference FIGS. 5 and 6. In these examples, microstrip patches are used for the antenna elements 52, 54 (FIG. 7) and 52*a*, 52*b*, 54*a*, 54*b* (FIG. 8). The two antennas (Tx and Rx) on each face of the module in FIG. 8 operate similarly to the single Tx/Rx antenna element on each face in FIG. 7. The module/box or housing 50, 50*a* may be a metal box containing a DC power supply or DC power converter, amplifiers, filters and diplexers (if required), as described above with reference to FIGS. 5 and 6. The electronics are inside the box or module and may be discrete parts, connected together via SMA connectors. For lower power systems, the electronics can be surface mount PCB.

The antennas can be conformal types, such as microstrip patches, or dipoles or monopoles. However, all components are part of a single package or module. FIG. 16 illustrates an approach which uses an array of antenna elements in order to increase the passive gain. The example shown in FIG. 16 uses two columns of patch array antennas on one face of the module, designated by reference numerals 54*a* through 54*h*. The antenna patches 54*a* through 54*d* are designated as receive (Rx) antennas in the embodiment shown on FIG. 16 while the antenna elements 54*e* through 54*h* are designated as transmit (Tx) antenna elements in this embodiment. It will be appreciated that a similar array of antenna elements corresponding to the antenna elements 52 of the prior embodiments would be mounted to the opposite face (not shown) of the repeater module 50*b* of FIG. 16. Moreover, fewer or more array elements might be utilized in other patterns than that shown on FIG. 16, without departing from the invention.

In the embodiment shown on FIG. 16, the use of four elements, which are summed together in an array, would achieve approximately four times (6 dB): the gain of a single receive or transmit element such as the element 54 shown in FIG. 7, for example. Thus, with four elements also on the opposite face (not shown), this adds a total of 12 dBi of additional passive gain to the system, which can be used to reduce the required active gain by as much as 12 dB and also to reduce the required isolation by as much as 12 dB. While the near field wave mechanics might not permit a full 12 dB to be achieved, nonetheless, some considerable improvement can be expected from this approach. However, it is noted that the vertical beam width of the system will be reduced somewhat by this approach.

Figure 9:
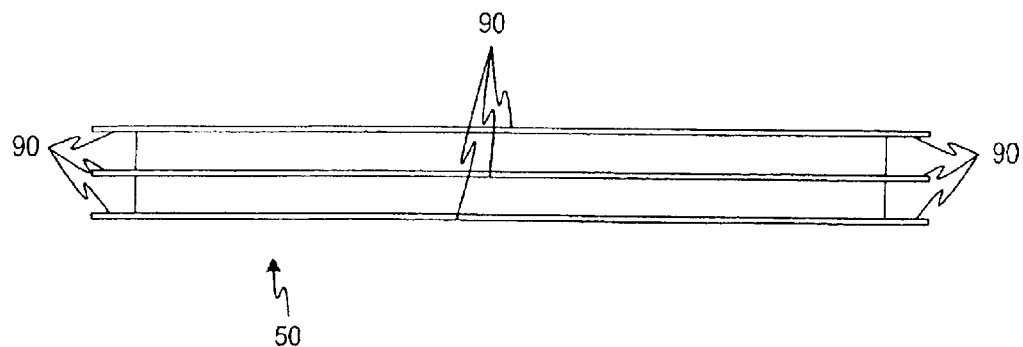
FIGS. 9, 10 and 11 are a top view, an elevation and a front perspective view, respectively, of a repeater module in accordance with one embodiment of the invention.
Figure 10:
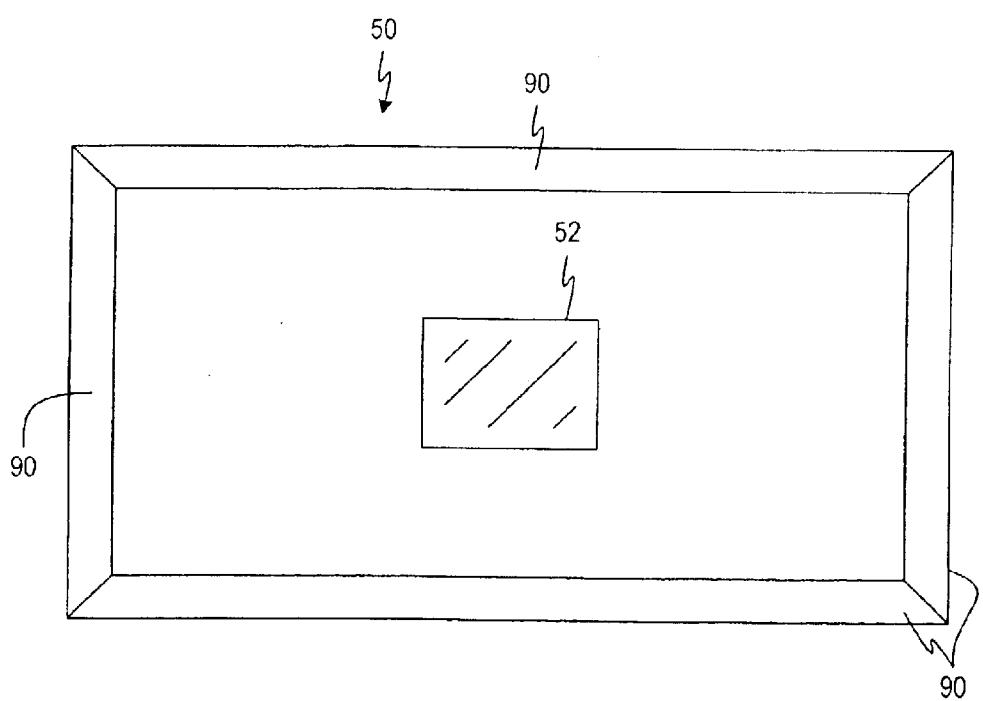
Figure 11:
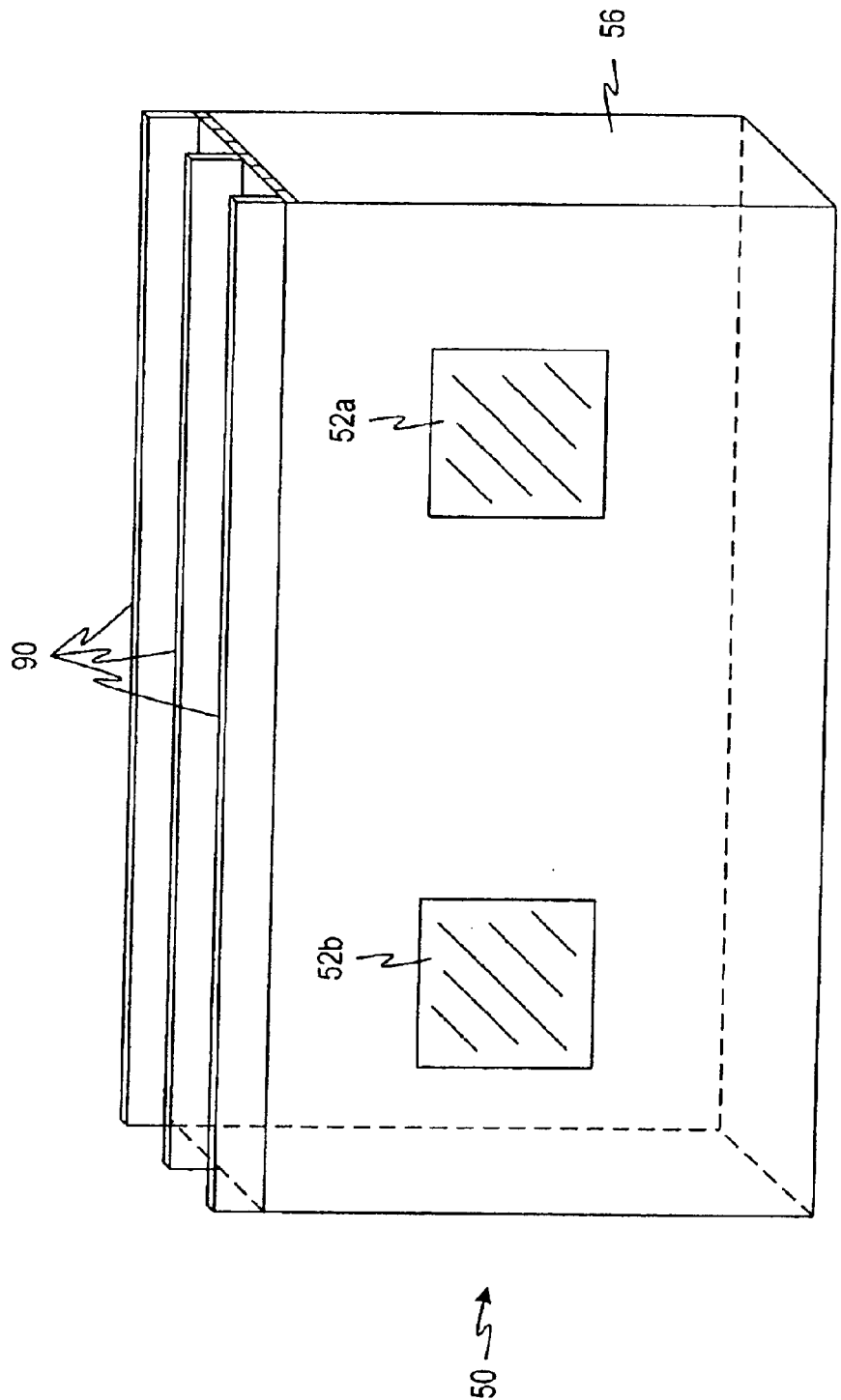

Is The respective antennas of FIGS. 7, 8 and 16 are "fixed" in position and orientation. The position and orientation of antennas is designed to assure maximum isolation between the antennas and to receive and transmit a given signal, and therefore maximize system gain. This isolation between antennas is controlled/maximized (and mutual coupling minimized) in the following ways:

a) The two antennas (or sets of antennas) are positioned such that for each, the F/B ratios sum to a maximum. For example, for a perfectly rectilinear module, the two antennas (or sets of antennas) each face oppositely by 180 degrees, or within an acceptable tolerance.

b) The two antennas of each path, are polarized in mutually orthogonal (perpendicular) directions, which further reduces the mutual coupling (increases the isolation) by roughly 20 to 30 dB. For example, elements 52, 52a, 52b may be horizontally polarized, and elements 54, 54a, 54b may be vertically polarized, or vice-versa.

c) Electromagnetic shunt elements 90 (see FIG. 9) may also be provided on the edges or borders of the module or housing structure 50, 50i ato absorb (shunt) power to ground. This reduces the wave coupling from an antenna on one side, to an antenna on the other side. FIG. 11 shows only the top shunt element 90, it being understood that similar shunt elements 90 (not shown in FIG. 11, but shown in FIGS. 9 and 10), would be used on the other three lateral sides, as indicated in FIGS. 9 and 10. These shunts or RF chokes 90 may be extruded of electrically-conductive metallic material and project from the four sides of the housing 56 to absorb stray electromagnetic energy, which is ported to ground. Alternatively, the four sides of the housing (i.e., excluding the two sides on which the antennas are mounted) may be composed of metallic material and grounded so as to shunt stray electromagnetic energy to ground. However,: the projecting fins or strips of the shunt elements 90 improve on this situation, by receiving stray RF energy like an antenna, and being shorted to the ground plane. Alternatively, the shunts or RF chokes 90 may be extruded of plastic or other extrudable material and metal-coated. The height or projection of the fins of the shunts 90 relative to the sides of the housing may be on the order of a quarter wavelength relative to the frequencies of the transmitting antenna element or elements.

Design of the antennas, beams, and (control of) F/B ratios assures adequate isolation between the two opposing antennas (or antenna sets). The antennas' F/B ratios or isolation is the largest limiter for the total system gain.

A small lamp, LED, or other display element 100 can be used (see FIGS. 7 and 8) with appropriate RF power sensing electronics 80 (see FIGS. 5 and 6) to aid the provider/user/customer in orienting the unit or module 50 or 50a or 50b with a link antenna directed/pointed towards a base station, such that sufficient signal power is being received, i.e., at or above some predetermined threshold.

The above described repeater modules can be used in a number of applications, a few examples of which are as follows.

Figure 14:
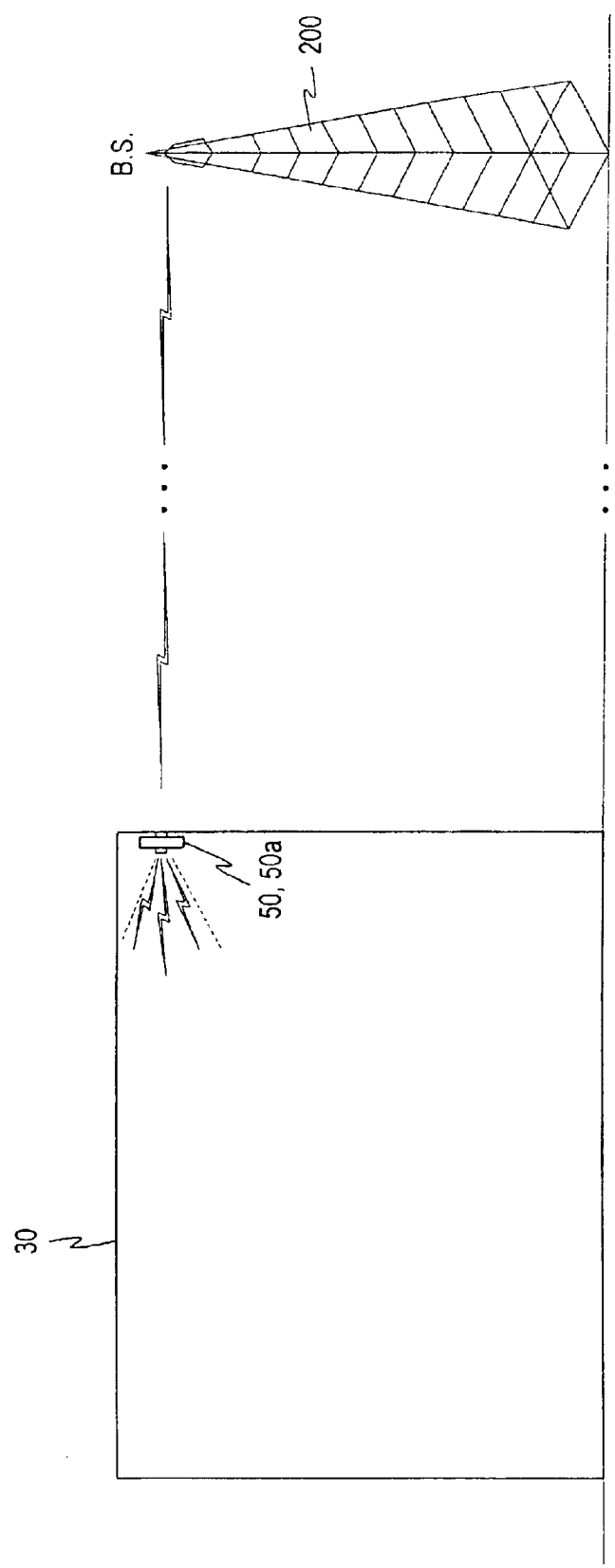
FIG. 14 is a diagramatic representation of an in-building repeater system in accordance with the invention.

1) Indoor Repeater (see FIG. 14)

Figure 12:
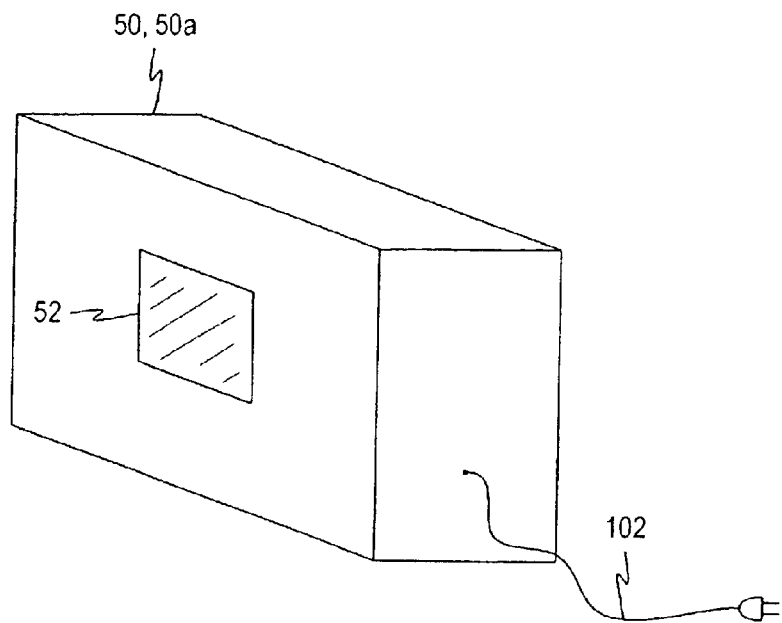
FIGS. 12 and 13 are simplified illustrations of repeater modules in accordance with other forms of the invention.
Figure 13:
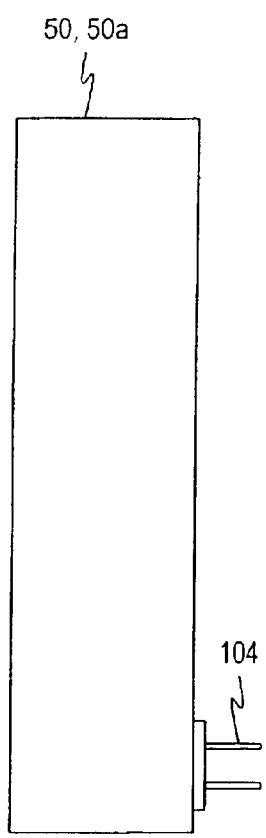

The module 50 or 50a can be mounted on a wall or window, at or near a location where the RF signal power from a nearby base station is at its maximum power level (within the building). Power for each module can be via either a 120 volt cord and plug 102, or with a 120 volt plug connection 104, built directly into the module (see FIGS. 12 and 13). Both allow very simple installation, by the customer. Generally, the RF signal is received, at a power level above the noise floor, from a nearby base station (with the module placed in a location facing the base station), and the repeater re-radiates the (amplified) RF signal into the building. Additionally, signals from remote units (handsets/cellphones) within the building are received by the modules 50 (50a, 50b), amplified, and re-radiated back to the base station 200.

Figure 15:
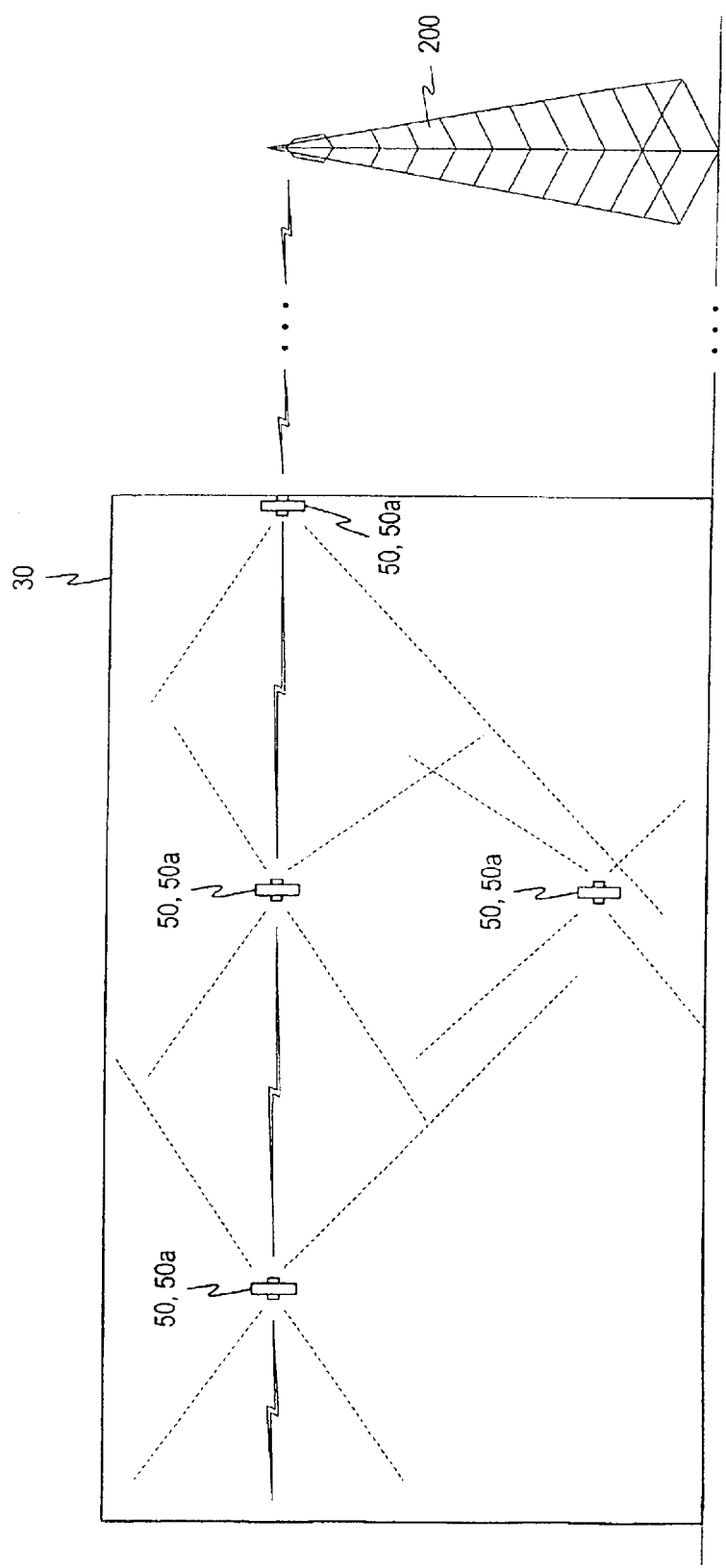
FIG. 15 is a diagramatic representation of another form of in-building repeater system in accordance with the invention.

2) Daisy-Chained Indoor Repeater (see FIG. 15)

A plurality of repeater modules 50 or 50a or 50b are placed at various locations within a building, "daisy chained" together, to provide greater coverage within the building. Power for each module can be via either a 120 volt cord and plug 102, or with is a 120 volt plug connection 104, built directly into the module (see FIGS. 12 and 13). Both allow very simple installation, by the customer. This aids in providing coverage to the side of the building opposite to the base station, or any other RF null or "blank" areas within the building. In this way, the provider or customer can cheaply and easily install two or more modules, to provide coverage to various area(s) of the building, such as the side opposite the side nearest the base station, where the RF signal level (from the base station) has low Signal to Noise (ratio), or where there is no signal at all.

3) Outdoor Null Fill Repeater

A single module can be installed on a tower, instead of a more conventional unit requiring discrete antennas. This provides a smaller more economical package, and less labor (time) and effort in orienting the antennas to assure adequate isolation between the antennas.

4) Outdoor Repeater to Building

A single module can be installed on a tower, in the same fashion as above, realizing the same benefits.

The applications mentioned above in 1)–4) are independent of frequency band. That is, any of these applications might be used in any frequency band, including, but not limited to, the following:

a) Cellular (800 MHz band)

b) PCS (1800 and 1900 MHz bands)-(Personal Communications Service)

c) GSM (900 and 1800 MHz bands)-(Global System for Mobile communications)

d) MMDS (2500 MHz band)-(Multi-channel Multipoint Distribution Service)

e) LMDS (26 GHz band)-(Local Multipoint Distribution Service)

f) Bluetooth Applications (2400 MHz band)-(Bluetooth is the name of a wireless protocol standard, created by Ericsson)

g) Indoor Wireless LANs (2400 MHz band)-(Local Area Network)

h) 3G (3rd Generation PCS systems) at 1900 MHz (U.S.) and 1800–2200 MHz (Europe)

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A modular repeater comprising:
   a housing having a pair of substantially 180° oppositely facing surfaces;
   at least one patch antenna element mounted to each of said surfaces for radiating energy in a direction opposite to that of the antenna element mounted to the other of said surfaces; and
   an electronic circuit mounted within said housing and operatively coupling signals between at least one antenna element on each of said pair of oppositely facing surfaces of said housing.

2. The repeater of claim 1 wherein a single antenna element is mounted to each of said oppositely facing surfaces of said housing and wherein said electronic circuit comprises a frequency diplexer operatively coupled with each of said antennas and a pair of signal transmission circuits coupled between said frequency diplexers.

3. The repeater of claim 2 wherein each of said signal transmission circuits transmits a signal in one direction between said two antenna elements, each of said signal transmission circuits comprising a first filter to attenuate the bandwidth of incoming communications signals, an amplifier to amplify communications signals received from said first filter and a second filter located at an output of said amplifier to protect the amplifier from signal power in the other signal transmission circuit.

4. The repeater claim 1 wherein two antenna elements are mounted to each side of said module housing, one for transmitting communications signals and one for receiving communications signals.

5. The repeater of claim 4 wherein said electronic circuit comprises a pair of signal transmission circuits, each forming a signal path between a transmitting antenna on one surface of said housing and a receiving antenna on the opposite surface of said housing, and wherein each of said signal transmission circuits comprises a first filter to attenuate the bandwidth of incoming communications signals, an amplifier which amplifies communications signals received from the first filter, and a second filter located at an output of said amplifier to protect the amplifier from signal power in the other of said signal transmission circuits.

6. The repeater of claim 1 wherein each of said antenna elements comprises a microstrip patch.

7. The repeater of claim 1 and further including a plurality of electromagnetic shunt elements located along surfaces of said housing which join said oppositely facing surfaces on which said antenna elements are located.

8. The repeater of claim 1 and further including one of an AC power cord and an AC power plug extending from said housing for coupling said modular repeater to a source of AC power, said AC power plug also being capable of mounting said modular repeater to an AC wall receptacle.

9. The modular repeater of claim 1, wherein each of said antenna elements comprises an array of microstrip patch elements.

10. The method of claim 1 and further including extending one of an AC power cord and an AC power plug from said housing for coupling said modular repeater to a source of AC power, said AC power plug also being capable of mounting said modular repeater to an AC wall receptacle.

11. A modular repeater comprising:
    a housing having a pair of substantially 180° oppositely facing surfaces;
    at least one antenna element mounted to each of said surfaces for radiating energy in a direction opposite to that of the antenna element mounted to the other of said surfaces; and
    an electronic circuit mounted within said housing and operatively coupling signals between at least one antenna element on each of said pair of oppositely facing surfaces of said housing, wherein said electronic circuit includes a signal strength circuit and further including a display element operatively coupled with said signal strength circuit and visible from externally of said housing for indicating alignment of said modular repeater with a signal source providing signal strength equal to or greater than a preselected threshold.

12. An indoor repeater comprising a repeater module mounted to an inside surface of an enclosed area such as a building or the like, in a location generally facing a signal source, said repeater module comprising:
    a housing having a pair of substantially 180° oppositely facing surfaces;
    at least one patch antenna element mounted to each of said surfaces for radiating energy in a direction opposite to that of the antenna element mounted to the other of said surfaces; and
    an electronic circuit mounted within said housing and operatively coupling signals between at least one antenna element on each of said pair of oppositely facing surfaces of said housing.

13. The repeater of claim 12 wherein a single antenna element is mounted to each of said oppositely facing surfaces of said housing and wherein said electronic circuit comprises a frequency diplexer operatively coupled with each of said antennas and a pair of signal transmission circuits coupled between said frequency diplexers.

14. The repeater of claim 13 wherein each of said signal transmission circuits transmits a signal in one direction between said two antenna elements, each of said signal transmission circuits comprising a first filter to attenuate the bandwidth of incoming communications signals, an amplifier to amplify communications signals received from said first filter and a second filter located at an output of said amplifier to protect the amplifier from signal power in the other signal transmission circuits.

15. The repeater of claim 12 wherein two antenna elements are mounted to each side of said module housing, one for transmitting communications signals and one for receiving communications signals.

16. The repeater of claim 15 wherein said electronic circuit comprises a pair of signal transmission circuits, each forming a signal path between a transmitting antenna on one surface of said housing and a receiving antenna on the opposite surface of said housing, and wherein each of said signal transmission circuits comprises a first filter to attenuate the bandwidth of incoming communications signals, an amplifier which amplifies the communications signals received from the first filter, and a second filter located at an output of said amplifier to protect the amplifier from signal power in the other of said signal transmission circuits.

17. The repeater of claim 12 wherein each of said antenna elements comprises a microstrip patch.

18. The repeater of claim 12 and further including a plurality of electromagnetic shunt elements located along surfaces of said housing which join said oppositely facing surfaces on which said antenna elements are located.

19. The repeater of claim 12 and further including one of an AC power cord and an AC power plug extending from said housing for coupling said modular repeater to a source of AC power, said AC power plug also mounting said modular repeater to an AC wall receptacle.

20. The repeater of claim 12, wherein each of said antenna elements comprises an array of microstrip patch elements.

21. An indoor repeater comprising a repeater module mounted to an inside surface of an enclosed area such as a building or the like, in a location generally facing a signal source, said repeater module comprising:

a housing having a pair of substantially 180° oppositely facing surfaces;

at least one antenna element mounted to each of said surfaces for radiating energy in a direction opposite to that of-the antenna element mounted to the other of said surfaces; and an electronic circuit mounted within said housing and operatively coupling signals between at least one antenna element on each of said pair of oppositely facing surfaces of said housing, wherein said electronic circuit includes a signal strength circuit and further including a display element operatively coupled with said signal strength circuit and visible form externally of said housing or indicating alignment of said repeater module with a signal source providing signal strength equal to or greater than a preselected threshold.

22. An indoor repeater system for use in an enclosed area such as a building or the like, comprising a plurality of repeater modules, at least one of said repeater modules being mounted in a location for receiving an optimal signal level from a signal source external to said enclosed area, and the other repeater modules being placed for distributing communication signals around at least a desired portion of the enclosed area, each of said repeater modules comprising:

a housing having a pair of substantially 180° oppositely facing surfaces;

at least one patch antenna element mounted to each of said surfaces for radiating energy in a direction opposite to that of the antenna element mounted to the other of said surfaces; and an electronic circuit mounted within said housing and operatively coupling signals between at least one antenna element on each of said oppositely facing surfaces of said housing.

23. The repeater system of claim 22 wherein a single antenna element is mounted to each of said oppositely facing surfaces of said housing and wherein said electronic circuit comprises a frequency diplexer operatively coupled with each of said antennas and a pair of signal transmission circuits coupled between said frequency diplexers.

24. The repeater system of claim 23 wherein each of said signal transmission circuits transmits a signal in one direction between said two antenna elements, each of said signal transmission circuits comprising a first filter to attenuate the bandwidth of incoming communications signals, an amplifier to amplify communications signals received from said first filter, and a second filter located at an output of said amplifier to protect the amplifier from signal power in the other signal transmission circuits.

25. The repeater system of claim 22 wherein two antenna elements are mounted to each side of said module housing, one for transmitting communications signals and one for receiving communications signals.

26. The repeater system of claim 25 wherein said electronic circuit comprises a pair of signal transmission circuits, each forming a signal path between a transmitting antenna on one surface of said housing and a receiving antenna on the opposite surface of said housing, and wherein each of said signal transmission circuits comprises a first filter to attenuate the bandwidth of incoming communications signals, an amplifier which amplifies the communications signals received from the first filter and a second filter located at an output of said amplifier to protect the amplifier from signal power in the other of said signal transmission circuits.

27. The repeater system of claim 22 wherein each of said antenna elements comprises a microstrip patch.

28. The repeater system of claim 22 and further including a plurality of electromagnetic shunt elements located along surfaces of said housing which join said oppositely facing surfaces on which said antenna elements are located.

29. The repeater system of claim 22 and further including one of an AC power cord and an AC power plug extending from said module for coupling said module to a source of AC power, said AC power plug also being capable of mounting said module to an AC wall receptacle.

30. The indoor repeater system of claim 22, wherein each of said antenna elements comprises an array of microstrip patch elements.

31. An indoor repeater system for use in an enclosed area such as a building or the like, comprising a plurality of repeater modules, at least one of said repeater modules being mounted in a location for receiving an optimal signal level from a signal source external to said enclosed area, and the other repeater modules being placed for distributing communication signals around at least a desired portion of the enclosed area, each of said repeater modules comprising:

a housing having a pair of substantially 180° oppositely facing surfaces;

at least one antenna element mounted to each of said surfaces for radiating energy in a direction opposite to that of the antenna element mounted to the other of said surfaces; and an electronic circuit mounted within said housing and operatively coupling signals between at least one antenna element on each of said oppositely facing surfaces of said housing, wherein said electronic circuit includes a signal strength circuit and further including a display element operatively coupled with said signal strength circuit and visible from externally of said housing for indicating alignment of said module with a signal source providing signal strength equal to or greater than a preselected threshold.

32. An outdoor repeater module installable on a tower or other elevated structure comprising:

a housing having a pair of substantially 180° oppositely facing surfaces;

at least one patch antenna element mounted to each of said surfaces for radiating energy in a direction opposite to that of the antenna element mounted to the other of said surfaces; and an electronic circuit mounted within said housing and operatively coupling signals between at least one antenna element on each of said oppositely facing surfaces of said housing.

33. The repeater of claim 32 wherein a single antenna element is mounted to each of said oppositely facing surfaces of said housing and wherein said electronic circuit comprises a frequency diplexer operatively coupled with each of said antennas and a pair of signal transmission circuits coupled between said frequency diplexers.

34. The repeater of claim 33 wherein each of said signal transmission circuits transmits a signal in one direction between said two antenna elements, each of said signal transmission circuits comprising a first filter to attenuate the bandwidth of incoming communications signals, an amplifier to amplify the communications signals received from said first filter, and a second filter located at an output of said amplifier to protect the amplifier from signal power on the other signal transmission circuits.

35. The repeater of claim 32 wherein two antenna elements are mounted to each side of said module housing, one for transmitting communications signals and one for receiving communications signals.

36. The repeater of claim 35 wherein said electronic circuit comprises a pair of signal transmission circuits, each forming a signal path between a transmitting antenna on one surface of said housing and a receiving antenna on the opposite surface of said housing, and wherein each of said signal transmission circuits comprises a first filter to attenuate the bandwidth of incoming communications signals, an amplifier which amplifies communications signals received from the first filter, and a second filter located at an output of said amplifier to protect the amplifier from signal power in the other of said signal transmission circuits.

37. The repeater of claim 32 wherein each of said antenna elements comprises a microstrip patch.

38. The repeater of claim 32 and further including a plurality of electromagnetic shunt elements located along surfaces of said housing which join said oppositely facing surfaces on which said antenna elements are located.

39. The outdoor repeater module of claim 32, wherein each of said antenna elements comprises an array of microstrip patch elements.

40. An outdoor repeater module installable on a tower or other elevated structure comprising:

a housing having a pair of substantially 180° oppositely facing surfaces;

at least one antenna element mounted to each of said surfaces for radiating energy in a direction opposite to that of the antenna element mounted to the other of said surfaces; and an electronic circuit mounted within said housing and operatively coupling signals between at least one antenna element on each of said oppositely facing surfaces of said housing, wherein said electronic circuit includes a signal strength circuit and further including a display element operatively coupled with said signal strength circuit and visible from externally of said housing for indicating alignment of said module with a signal source providing signal strength equal to or greater than a preselected threshold.

41. A method of constructing a modular repeater comprising:

providing a housing having a pair of substantially 180° oppositely facing surfaces;

mounting at least one patch antenna element to each of said oppositely facing surfaces for radiating energy in a direction opposite to that of the antenna element mounted to the other of said oppositely facing surfaces;

mounting an electronic circuit within said housing, said electronic circuit operatively coupling signals between at least one antenna element on each of said pair of oppositely facing surfaces of said housing.

42. The method of claim 41 including mounting two antenna elements to each side of said module housing, one for transmitting communications signals and one for receiving communications signals.

43. The method of claim 41 and further including positioning a plurality of electromagnetic shunt elements along surfaces of said housing which join said oppositely facing surfaces on which said antenna elements are located.

44. A method of constructing a modular repeater comprising:

providing a housing having a pair of substantially 180° oppositely facing surfaces;

mounting at least one antenna element to each of said oppositely facing surfaces for radiating energy in a direction opposite to that of the antenna element mounted to the other of said oppositely facing surfaces;

mounting an electronic circuit within said housing, said electronic circuit operatively coupling signals between at least one antenna element on each of said pair of oppositely facing surfaces of said housing, said electronic circuit determining signal strength and further including coupling a display element with electronic circuit and mounting said display element so as to be visible from externally of said housing for indicating alignment of said modular repeater with a signal source providing a signal strength equal to or greater than a preselected threshold.

\* \* \* \* \*